United States Patent
Bi et al.

(10) Patent No.: US 8,686,674 B2
(45) Date of Patent: Apr. 1, 2014

(54) METHOD FOR CONTROLLING BRUSHLESS DC MOTOR

(75) Inventors: Ronghua Bi, Zhongshan (CN); Yong Zhao, Zhongshan (CN)

(73) Assignee: Zhongzshan Broad-Ocean Motor Co., Ltd., Zhongshan (CN)

( * ) Notice: Subject to any disclaimer, the term of this patent is extended or adjusted under 35 U.S.C. 154(b) by 231 days.

(21) Appl. No.: 12/728,187

(22) Filed: Mar. 19, 2010

(65) Prior Publication Data

US 2010/0237814 A1  Sep. 23, 2010

(30) Foreign Application Priority Data

Mar. 20, 2009 (CN) .......................... 2009 1 0038187

(51) Int. Cl.
*H02P 23/00* (2006.01)
*H02K 29/00* (2006.01)

(52) U.S. Cl.
USPC .................................. 318/400.14; 318/400.01

(58) Field of Classification Search
USPC ............. 318/400.13, 400.14, 400.01, 400.03, 318/400.1
See application file for complete search history.

(56) References Cited

U.S. PATENT DOCUMENTS

| 4,818,908 | A | * | 4/1989 | Tamae et al. ................... 310/171 |
| 5,229,693 | A | * | 7/1993 | Futami et al. ............. 318/400.14 |
| 7,982,420 | B2 | * | 7/2011 | Kakimoto et al. ........ 318/400.34 |
| 2004/0061470 | A1 | * | 4/2004 | Ito et al. ........................ 318/565 |
| 2009/0009116 | A1 | * | 1/2009 | Kakimoto et al. ........ 318/400.34 |

FOREIGN PATENT DOCUMENTS

JP  08163891 A  *  6/1996

* cited by examiner

*Primary Examiner* — Eduardo Colon Santana
(74) *Attorney, Agent, or Firm* — Matthias Scholl P.C.; Matthias Scholl

(57) ABSTRACT

A method for controlling a brushless DC motor, comprising transmitting a phase-inversion signal to a motor control unit by a rotor position detecting unit after a motor enters a stable state, advancing or delaying phase shift by the motor control unit at an offset electrical angle, recording and comparing phase current values $I_n$ at different offset electrical angles whereby obtaining an optimum offset angle $\alpha_m$ corresponding to the minimum phase current value $I_{min}$, and advancing or delaying phase shift by the motor at the optimum offset angle $\alpha_m$. As the motor enters a stable state, the motor advances or delays phase shift at the optimum offset angle $\alpha_m$, at this time operating current of a coil winding of the motor is the minimum, which saves power and reduces cost.

15 Claims, 5 Drawing Sheets

METHOD FOR CONTROLLING BRUSHLESS DC MOTOR

CROSS-REFERENCE TO RELATED APPLICATIONS

Pursuant to 35 U.S.C. §119 and the Paris Convention Treaty, this application claims the benefit of Chinese Patent Application No. 200910038187.3 filed on Mar. 20, 2009, the contents of which are incorporated herein by reference.

BACKGROUND OF THE INVENTION

1. Field of the Invention

The invention relates to a method for controlling a motor, and more particularly to a method for controlling a brushless DC motor.

2. Description of the Related Art

As shown in FIG. 1, a conventional brushless DC motor in the prior art comprises a controller, an AC/DC converter, a DC/AC converter, a hall sensor, and a pulse width modulator (PWM). Phase shift of the conventional motor is implemented by detecting a position of a rotor via a measuring unit, and the measuring unit may be a Hall sensor. However, there is a problem with the motor: due to position errors of the Hall sensor or low accuracy of electronic components of the measuring unit, a measured phase shift position of the rotor is not an appropriate position, which causes phase current of coil windings of the motor to be very high, and increases power consumption.

SUMMARY OF THE INVENTION

In view of the above-described problem, it is one objective of the invention to provide a method for controlling a brushless DC motor that enables the motor to operate at the minimum phase current, saves power, reduces cost and improves working efficiency.

To achieve the above objectives, in accordance with one embodiment of the invention, provided is a method for controlling a brushless DC motor, comprising transmitting a phase-inversion signal to a motor control unit by a rotor position detecting unit after a motor enters a stable state, advancing or delaying phase shift by the motor control unit at an offset electrical angle, recording and comparing phase current values $I_n$ at different offset electrical angles whereby obtaining an optimum offset angle $\alpha_m$ corresponding to the minimum phase current value $I_{min}$, and advancing or delaying phase shift by the motor at the optimum offset angle $\alpha_m$.

In a class of this embodiment, the step of recording and comparing phase current values at different offset electrical angles whereby obtaining an optimum offset angle $\alpha_m$ corresponding to the minimum phase current value $I_{min}$ comprises detecting a position of a rotor of the motor by the rotor position detecting unit after the motor enters the stable state, inverting a phase by the motor control unit, and detecting a second average phase current value $I_0$ of a stator of the motor at this time by a current detecting circuit.

In a class of this embodiment, the step of recording and comparing phase current values at different offset electrical angles whereby obtaining an optimum offset angle $\alpha_m$ corresponding to the minimum phase current value $I_{min}$ further comprises detecting a minimum offset electrical angle $\Delta\alpha$ in the stable state.

In a class of this embodiment, the step of recording and comparing phase current values at different offset electrical angles whereby obtaining an optimum offset angle $\alpha_m$ corresponding to the minimum phase current value $I_{min}$ further comprises advancing or delaying phase shift at the minimum offset electrical angle $\Delta\alpha$ as the rotor position detecting unit detects a normal phase shift position of the rotor of the motor.

In a class of this embodiment, the step of recording and comparing phase current values at different offset electrical angles whereby obtaining an optimum offset angle $\alpha_m$ corresponding to the minimum phase current value $I_{min}$ further comprises detecting a second average phase current value $I_1$ of the stator of the motor at this time by the current detecting circuit.

In a class of this embodiment, the step of recording and comparing phase current values at different offset electrical angles whereby obtaining an optimum offset angle $\alpha_m$ corresponding to the minimum phase current value $I_{min}$ further comprises comparing the first average phase current value $I_1$ with the second average phase current value $I_0$ whereby determining advancing or delaying phase shift.

In a class of this embodiment, the step of recording and comparing phase current values at different offset electrical angles whereby obtaining an optimum offset angle $\alpha_m$ corresponding to the minimum phase current value $I_{min}$ further comprises obtaining an accumulated minimum offset electrical angle $n\Delta\alpha$ ($n=2, 3, 4, \ldots$).

In a class of this embodiment, the step of recording and comparing phase current values at different offset electrical angles whereby obtaining an optimum offset angle $\alpha_m$ corresponding to the minimum phase current value $I_{min}$ further comprises advancing or delaying phase shift at an offset electrical angle of $n\Delta\alpha$ by comparing the first average phase current value $I_1$ with the second average phase current value $I_0$.

In a class of this embodiment, the step of recording and comparing phase current values at different offset electrical angles whereby obtaining an optimum offset angle $\alpha_m$ corresponding to the minimum phase current value $I_{min}$ further comprises obtaining different average phase current values $I_n$ of the stator of the motor after an offset electrical angle is varied by the current detecting circuit.

In a class of this embodiment, the step of recording and comparing phase current values at different offset electrical angles whereby obtaining an optimum offset angle $\alpha_m$ corresponding to the minimum phase current value $I_{min}$ further comprises comparing the average phase current values $I_n$ whereby obtaining the minimum phase current value $I_{min}$ and the optimum offset angle $\alpha_m$ corresponding thereto.

In a class of this embodiment, the stable state is an operating state of the motor under a specific condition.

In a class of this embodiment, the stable state is a constant speed state.

In a class of this embodiment, the stable state is a constant torque state.

In a class of this embodiment, the stable state is a constant power stat

In a class of this embodiment, the phase shift signal is a current commutation signal Advantages of the invention comprise: as the motor enters a stable state, the motor advances or delays phase shift at the optimum offset angle $\alpha_m$, at this time operating current of a coil winding of the motor is the minimum, which saves power and reduces cost.

DETAILED DESCRIPTION OF THE EMBODIMENTS

Detailed description will be given below in conjunction with specific embodiments and accompanying drawings.

Figure 1:
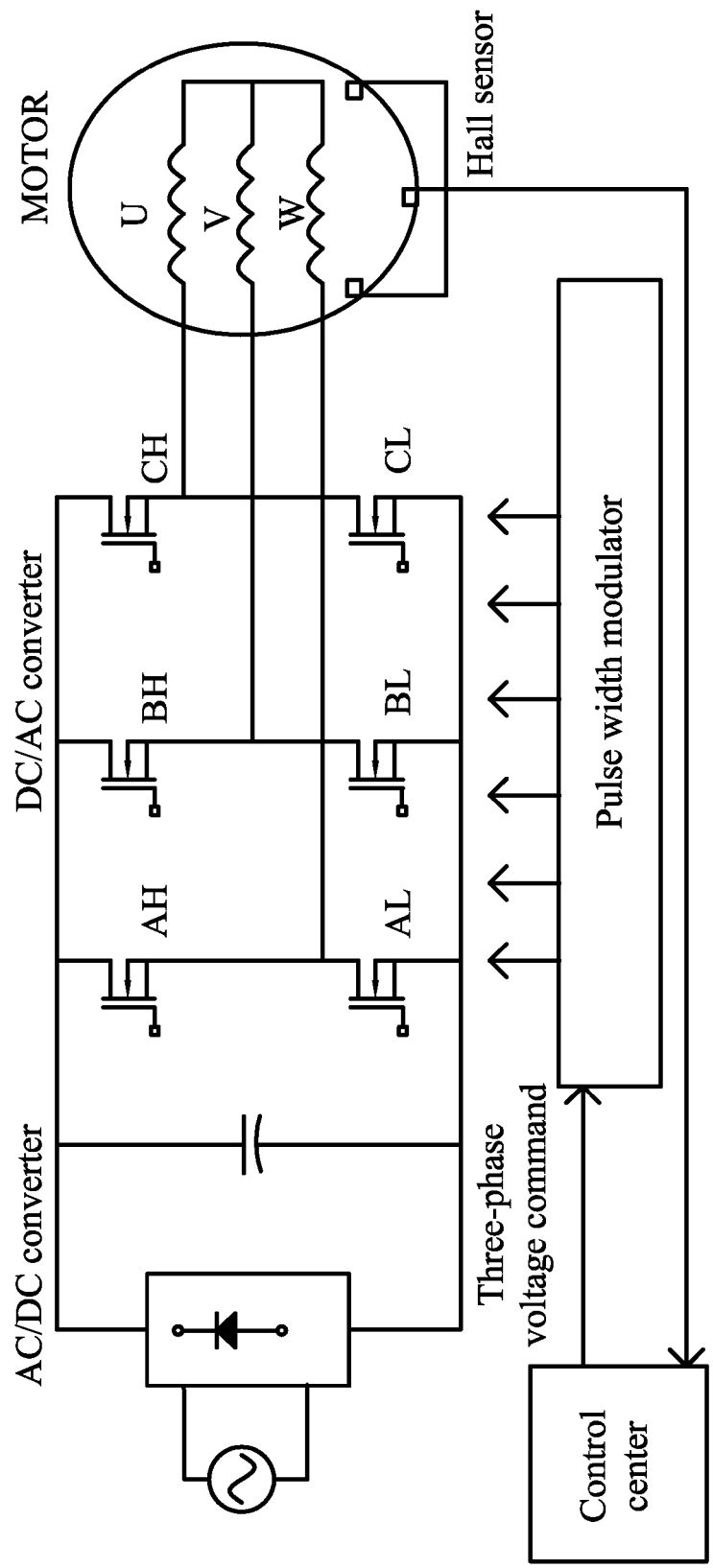
FIG. 1 is a schematic diagram of a brushless DC motor in the prior art.
Figure 2:
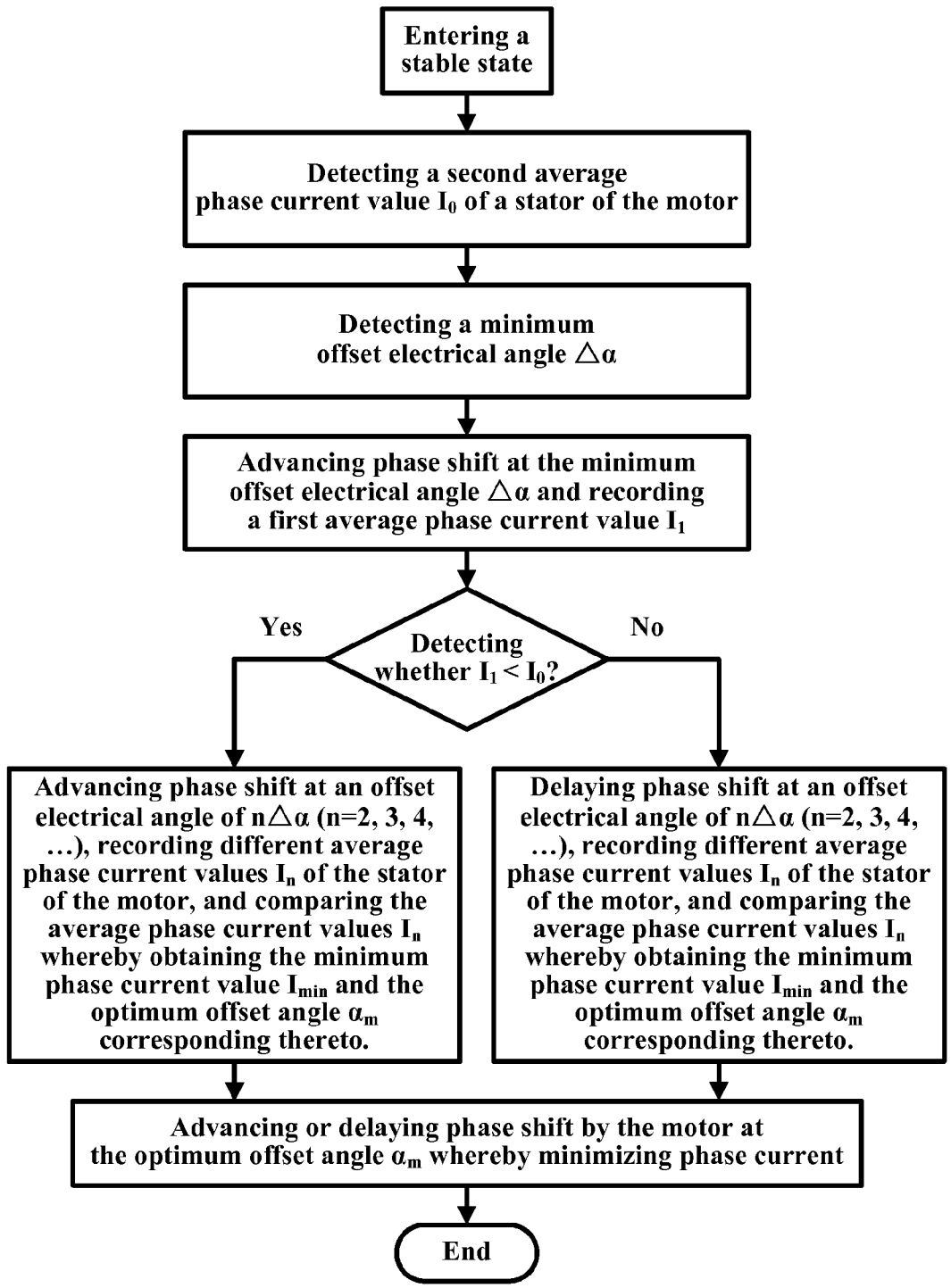
FIG. 2 is a flowchart of a method for controlling a brushless DC motor of an exemplary embodiment of the invention.

As shown in FIG. 2, a method for controlling a brushless DC motor of the invention comprises transmitting a phase-inversion signal to a motor control unit by a rotor position detecting unit after a motor enters a stable state, advancing or delaying phase shift by the motor control unit at an offset electrical angle, recording and comparing phase current values $I_n$ at different offset electrical angles whereby obtaining an optimum offset angle $\alpha_m$ corresponding to the minimum phase current value $I_{min}$, and advancing or delaying phase shift by the motor at the optimum offset angle $\alpha_m$.

The step of recording and comparing phase current values at different offset electrical angles whereby obtaining an optimum offset angle $\alpha_m$ corresponding to the minimum phase current value $I_{min}$ comprises:

1) detecting a position of a rotor of the motor by the rotor position detecting unit after the motor enters the stable state, inverting a phase by the motor control unit, and detecting a second average phase current value $I_0$ of a stator of the motor at this time by a current detecting circuit;

2) detecting a minimum offset electrical angle $\Delta\alpha$ in the stable state;

3) advancing or delaying phase shift at the minimum offset electrical angle $\Delta\alpha$ as the rotor position detecting unit detects a normal phase shift position of the rotor of the motor, detecting a second average phase current value $I_1$ of the stator of the motor at this time by the current detecting circuit, and comparing the first average phase current value $I_1$ with the second average phase current value $I_0$ whereby determining advancing or delaying phase shift;

4) obtaining an accumulated minimum offset electrical angle $n\Delta\alpha$ (n=2, 3, 4, . . . ), advancing or delaying phase shift at an offset electrical angle of $n\Delta\alpha$ by comparing the first average phase current value $I_1$ with the second average phase current value $I_0$, obtaining different average phase current values $I_n$ of the stator of the motor after an offset electrical angle is varied by the current detecting circuit, and comparing the average phase current values $I_n$ whereby obtaining the minimum phase current value $I_{min}$ and the optimum offset angle $\alpha_m$ corresponding thereto.

In this embodiment, the stable state is an operating state of the motor under a specific condition, a constant speed state, a constant torque state, or a constant power state.

Example 1

Figure 3:
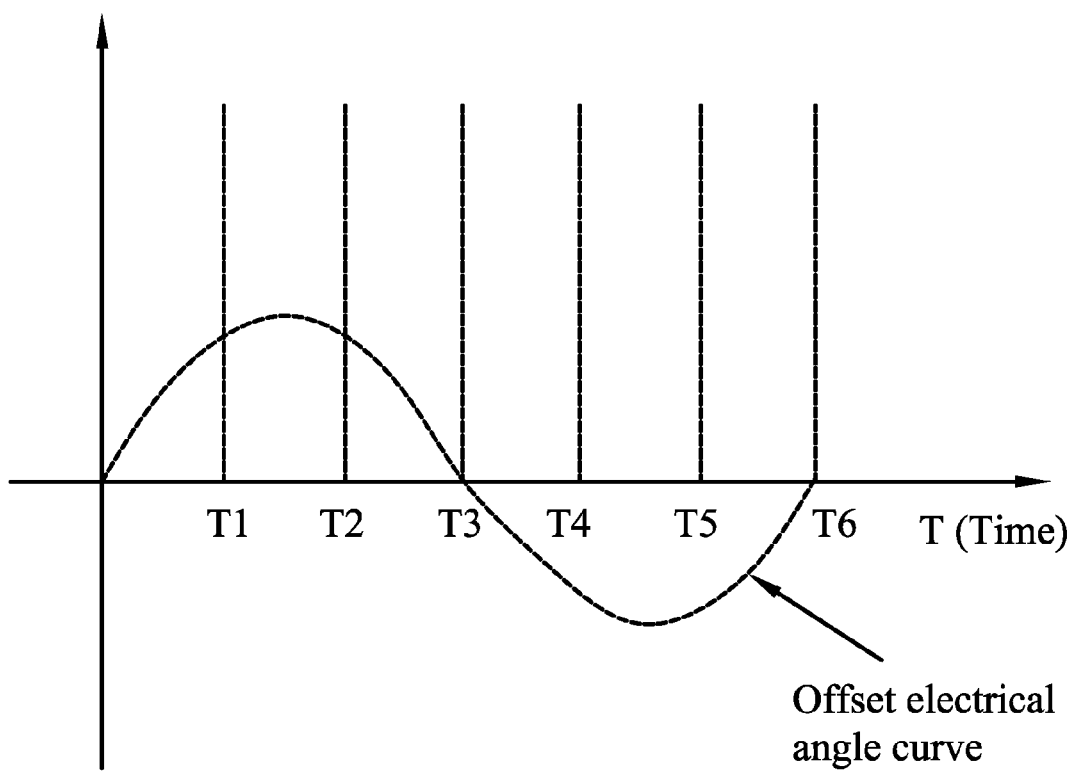
FIG. 3 is a curve illustrating an offset electrical angle of the invention.

As shown in FIG. 3, after six phase shift moments T1, T2, . . . , T6, a phase shift period is formed. As the rotor of the motor rotates a circle, transistors AH and BL are connected to coil windings W and V, transistors AH and CL are connected to coil windings W and U, transistors BH and CL are connected to coil windings V and U, transistors BH and AL are connected to coil windings V and W, transistors CH and AL are connected to coil windings U and W, and transistors CH and BL are connected to coil windings U and V.

In principle, phase shift is performed once every 60 degrees. However, due to position errors of the Hall sensor or low accuracy of electronic components of a measuring unit, a phase shift position of the rotor is not the optimum phase shift position, which causes large operating current of all coil windings and increases power consumption. Therefore, as the motor enters the stable state (for example, it rotates at a constant speed of 1000 circles per minute), an optimum phase shift position needs to be obtained whereby minimizing the phase current value.

Figure 4:
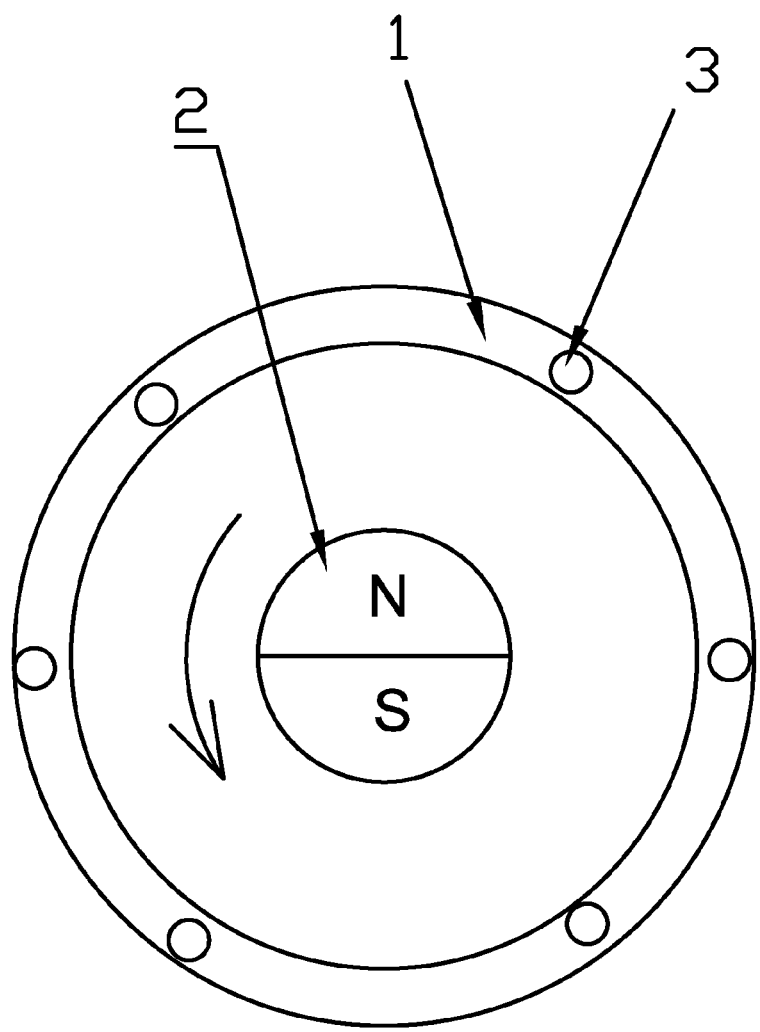
FIG. 4 is a schematic view of a brushless DC motor of an exemplary embodiment of the invention.

As shown in FIG. 4, a phase shift period comprises six phase shift moments. The Hall sensor 3 on the stator 1 is capable of detecting a position of the rotor 2. As the rotor 2 reaches a position, the Hall sensor 3 transmits a phase shift signal.

As the Hall sensor transmits a signal at a time T1, the transistors AH and BL are enabled, and the coil windings W and V are also enabled and operate A method of obtaining the minimum phase current value $I_{min}$ and the optimum offset angle $\alpha_m$ corresponding thereto is as follows:

1) the rotor position detecting unit detects a position of the rotor of the motor after the motor enters the stable state, the motor control unit performs phase shift, and the current detecting circuit detects the second average phase current value $I_0$ of the stator of the motor at this time 2) detecting the minimum offset electrical angle $\Delta\alpha$ of 0.1 degree in the stable state;

3) advancing phase shift at the minimum offset electrical angle $\Delta\alpha$ of 0.1 degree, recording the first average phase current value $I_1$, and comparing the first average phase current value $I_1$ with the second average phase current value $I_0$ whereby determining advancing or delaying phase shift.

If phase shift is performed in advance ($I_1 < I_0$), phase shift of next time is performed at an angle of $2\Delta\alpha$ (0.2 degree) less than this time in advance, and a third phase current value $I_2$ is recorded and compared with the second average phase current value. If $I_2 < I_1$, an offset electrical angle is increased, and phase shift of next time is performed at an angle of $n\Delta\alpha$ less than this time in advance. If n=8 and $I_{n-1} < I_n$, then $I_{min} = I_{n-1}$, $\alpha_m = 7\Delta\alpha_n$. The minimum phase current value $I_{min}$ and the optimum offset angle $\alpha_m$ corresponding thereto are thus obtained. In the stable state, the transistors AH and BL are enabled, and phase shift is performed at an angle of 0.7 degree less than a normal angle in advance whereby minimizing operating current of the coil windings W and V. Phase shift methods of other coil windings are the same as above.

If phase shift is delayed ($I_1 > I_0$), phase shift of next time is delayed at an angle of $2\Delta\alpha$ (0.2 degree) greater than this time, and a third phase current value I2 is recorded and compared with the second average phase current value. If $I_2 < I_1$, an offset electrical angle is increased, and phase shift of next time is delayed at an angle of $n\Delta\alpha$ greater than this time. If n=8 and $I_{n-1} < I_n$, then $I_{min} = I_7$, $\alpha_m = 7\Delta\alpha_n = 0.7$. The minimum phase current value $I_{min}$ and the optimum offset angle $\alpha_m$ corresponding thereto are thus obtained. In the stable state, the transistors AH and BL are enabled, and phase shift is delayed at an angle of 0.7 degree greater than a normal angle in advance whereby minimizing operating current of the coil windings W and V. Phase shift methods of other coil windings are the same as above.

Example 2

Figure 5:
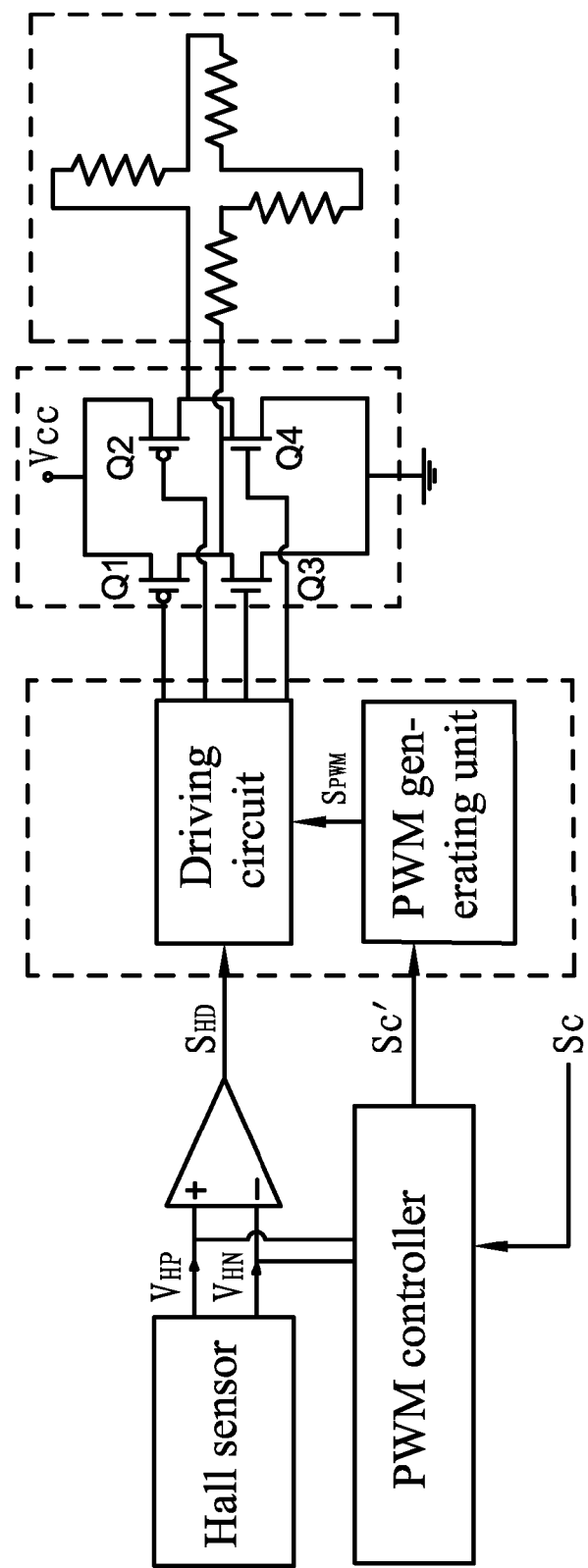
FIG. 5 is a schematic diagram of a brushless DC motor of another exemplary embodiment of the invention.

As shown in FIG. 5, the single-phase brushless DC motor requires no phase shift, but current commutation. Flow of current in one direction can be implemented via transistors Q1 and Q4, and the flow of current in the other direction can be implemented via transistors Q2 and Q3. In principle, phase shift is performed once every 180 degrees. However, due to position errors of the Hall sensor or low accuracy of electronic components of a measuring unit, a phase shift position of the rotor is not the optimum phase shift position, which causes large operating current of all coil windings and increases power consumption. Therefore, as the motor enters the stable state (for example, it rotates at a constant speed of 1000 circles per minute), an optimum phase shift position needs to be obtained whereby minimizing the phase current value.

As a Hall sensor transmits a signal at a time, the transistors Q1 and Q4 are enabled, and the coil windings are also enabled and operate.

A method of obtaining the minimum phase current value $I_{min}$ and the optimum offset angle $\alpha_m$ corresponding thereto is as follows:

1) recording an initial phase current value $I_0$ during the first current commutation as the motor enters a stable state;

2) detecting the minimum offset electrical angle $\Delta\alpha$ of 0.2 degree in the stable state;

3) delaying current commutation at the minimum offset electrical angle $\Delta\alpha$ of 0.2 degree, recording the first average phase current value $I_1$, and comparing the first average phase current value $I_1$ with the initial phase current value $I_0$ whereby determining advancing or delaying current commutation.

If current commutation is delayed ($I_1<I_0$), current commutation of next time is delayed at an angle of $2\Delta\alpha$ (0.4 degree) greater than this time in advance, and a third phase current value $I_2$ is recorded and compared with the first average phase current value $I_1$. If $I_2<I_1$, an offset electrical angle is increased, and current commutation of next time is delayed at an angle of $n\Delta\alpha$ less than this time. If n=8 and $I_{n-1}<I_n$, then $I_{min}=I_7$, $\alpha_m=7\Delta\alpha_n=1.4$ degree. The minimum phase current value $I_{min}$ and the optimum offset angle $\alpha_m$ corresponding thereto are thus obtained. In the stable state, the transistors Q1 and Q4 are enabled, and current commutation is delayed at an angle of 1.4 degree greater than a normal angle in advance whereby minimizing operating current of the coil windings. Current commutation methods of other transistors Q2 and Q3 are the same as above.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling a brushless DC motor, comprising transmitting a phase-inversion signal to a motor control unit by a rotor position detecting unit after a motor enters a stable state;

advancing or delaying phase shift by said motor control unit at an offset electrical angle;

recording and comparing phase current values $I_n$ at different offset electrical angles whereby obtaining an optimum offset angle $\alpha_m$ corresponding to the minimum phase current value $I_{min}$; and advancing or delaying phase shift by said motor at said optimum offset angle $\alpha_m$.

2. The method of claim 1, wherein the step of recording and comparing phase current values at different offset electrical angles whereby obtaining an optimum offset angle $\alpha_m$ corresponding to the minimum phase current value $I_{min}$ comprises detecting a position of a rotor of said motor by said rotor position detecting unit after said motor enters the stable state;

inverting a phase by said motor control unit; and detecting a second average phase current value $I_0$ of a stator of said motor at this time by a current detecting circuit.

3. The method of claim 2, wherein the step of recording and comparing phase current values at different offset electrical angles whereby obtaining an optimum offset angle $\alpha_m$ corresponding to the minimum phase current value $I_{min}$ further comprises detecting a minimum offset electrical angle $\Delta\alpha$ in the stable state.

4. The method of claim 3, wherein the step of recording and comparing phase current values at different offset electrical angles whereby obtaining an optimum offset angle $\alpha_m$ corresponding to the minimum phase current value $I_{min}$ further comprises advancing or delaying phase shift at said minimum offset electrical angle $\Delta\alpha$ as said rotor position detecting unit detects a normal phase shift position of said rotor of said motor.

5. The method of claim 4, wherein the step of recording and comparing phase current values at different offset electrical angles whereby obtaining an optimum offset angle $\alpha_m$ corresponding to the minimum phase current value $I_{min}$ further comprises detecting a second average phase current value $I_1$ of said stator of said motor at this time by said current detecting circuit.

6. The method of claim 5, wherein the step of recording and comparing phase current values at different offset electrical angles whereby obtaining an optimum offset angle $\alpha_m$ corresponding to the minimum phase current value $I_{min}$ further comprises comparing said first average phase current value $I_1$ with said second average phase current value $I_0$ whereby determining advancing or delaying phase shift.

7. The method of claim 6, wherein the step of recording and comparing phase current values at different offset electrical angles whereby obtaining an optimum offset angle $\alpha_m$ corresponding to the minimum phase current value $I_{min}$ further comprises obtaining an accumulated minimum offset electrical angle $n\Delta\alpha$ (n=2, 3, 4, . . . ).

8. The method of claim 7, wherein the step of recording and comparing phase current values at different offset electrical angles whereby obtaining an optimum offset angle $\alpha_m$ corresponding to the minimum phase current value $I_{min}$ further comprises advancing or delaying phase shift at an offset electrical angle of $n\Delta\alpha$ by comparing said first average phase current value $I_1$ with said second average phase current value $I_0$.

9. The method of claim 8, wherein the step of recording and comparing phase current values at different offset electrical angles whereby obtaining an optimum offset angle $\alpha_m$ corresponding to the minimum phase current value $I_{min}$ further comprises obtaining different average phase current values $I_n$ of said stator of said motor after an offset electrical angle is varied by said current detecting circuit.

10. The method of claim 9, wherein the step of recording and comparing phase current values at different offset electrical angles whereby obtaining an optimum offset angle $\alpha_m$ corresponding to the minimum phase current value $I_{min}$ further comprises comparing said average phase current values $I_n$ whereby obtaining said minimum phase current value $I_{min}$ and said optimum offset angle $\alpha_m$ corresponding thereto.

11. The method of claim 1, wherein said stable state is an operating state of said motor under a specific condition.

12. The method of claim 1, wherein said stable state is a constant speed state.

13. The method of claim 1, wherein said stable state is a constant torque state.

14. The method of claim 1, wherein said stable state is a constant power state.

15. The method of claim 1, wherein said phase shift signal is a current commutation signal.

* * * * *

UNITED STATES PATENT AND TRADEMARK OFFICE
CERTIFICATE OF CORRECTION

PATENT NO. : 8,686,674 B2
APPLICATION NO. : 12/728187
DATED : April 1, 2014
INVENTOR(S) : Ronghua Bi et al.

Page 1 of 1

It is certified that error appears in the above-identified patent and that said Letters Patent is hereby corrected as shown below:

ON THE TITLE PAGE

Change item "(73) Assignee: Zhongzshan Broad-Ocean Motor Co., Ltd., Zhongshan (CN)" to
-- (73) Assignee: Zhongshan Broad-Ocean Motor Co., Ltd., Zhongshan (CN) --.

Signed and Sealed this
First Day of December, 2015

Michelle K. Lee
*Director of the United States Patent and Trademark Office*